United States Patent [19]

Kaneyuki et al.

[11] Patent Number: 4,985,670

[45] Date of Patent: Jan. 15, 1991

[54] VOLTAGE REGULATOR FOR AC GENERATOR WITH TWO DISTINCT OUTPUT VOLTAGE

[75] Inventors: Kazutoshi Kaneyuki; Shiro Iwatani, both of Himeji, Japan

[73] Assignee: Mitsubishi Denki Kabushiki Kaisha, Tokyo, Japan

[21] Appl. No.: 305,053

[22] Filed: Feb. 2, 1989

[30] Foreign Application Priority Data

Feb. 12, 1988 [JP] Japan .................................. 63-31212

[51] Int. Cl.$^5$ .............................................. H02J 7/14
[52] U.S. Cl. ........................................ 322/28; 322/99
[58] Field of Search ...................... 322/22, 24, 25, 27, 322/28, 72, 73, 99; 323/297, 354; 320/64

[56] References Cited

U.S. PATENT DOCUMENTS

| | | | |
|---|---|---|---|
| 4,141,613 | 2/1979 | Mori et al. | 322/28 |
| 4,143,313 | 3/1979 | Arendt | 322/28 |
| 4,267,433 | 5/1981 | Sahm, III | 322/24 X |

FOREIGN PATENT DOCUMENTS 87140  6/1980  Japan .
88500  6/1987  Japan .

Primary Examiner—Steven L. Stephan
Assistant Examiner—Kristine Peckman
Attorney, Agent, or Firm—Sughrue, Mion, Zinn, Macpeak & Seas

[57] ABSTRACT

A voltage regulator circuit for an AC generator having two distinct DC output voltage levels is disclosed, which comprises a full-wave rectifier circuit for rectifying the AC voltages induced in the armature winding of the generator, and a change-over switch which selectively couples the battery and a high voltage load across the output terminals of the rectifier circuit, the negative output terminal of which is grounded. Further, a serial connection of three resistors is coupled across the positive terminal of the rectifier circuit and ground and a rectifier diode is coupled across the positive terminal of the field winding and a junction between the intermediate resistor and the extreme resistor coupled to the positive terminal of the rectifier circuit, the forward direction of the diode being directed from the positive to the negative terminal of the battery in the serial circuit formed by the diode, the intermediate resistor, and the other extreme resistor. The junction between the last named two resistors is coupled to a Zener diode through another rectifier diode, which Zener diode controls the switching of transistors regulating the flow of the field current supplied from the battery. A further serial circuit of two resistors is directly coupled across the battery, the junction being coupled to the Zener diode through still another rectifier diode. The resistors and rectifier diodes constituted a voltage divider circuit which automatically regulates the output voltage of the rectifier circuit to a lower and a higher level according to the position of the change-over switch.

6 Claims, 4 Drawing Sheets

VOLTAGE REGULATOR FOR AC GENERATOR WITH TWO DISTINCT OUTPUT VOLTAGE

BACKGROUND OF THE INVENTION

1. Field of the Invention

This invention relates to a voltage regulator for an alternating current generator of an automobile, etc., which has two distinct output voltage levels a lower voltage output for charging a battery, etc., and a higher voltage output for an electrical load operating at a voltage higher than that of the battery.

2. Description of the Prior Art

Automobiles are generally equipped with an alternating current generator which is used to charge a battery and supply power to electrical equipment thereof. Usually, such generators have only one output voltage level, at which the battery is charged and the electrical equipment is operated. In some cases, however, automobiles have electrical loads which are operated at a voltage level higher than that of the battery and other electrical equipment. For example, automobiles used in extremely cold regions may have heaters for rapidly melting ice that often forms on the wind shield, etc., thereof, such heaters requiring a voltage higher than the battery voltage. In such cases, the output of the alternating current generator must be regulated to two distinct voltage levels: to the lower level when operating in the normal mode to charge the battery, and to the higher level when temporarily operating in the high voltage mode to supply power to the high voltage electrical load such as an ice melting heater mentioned above.

FIG. 1 shows a circuit diagram of a conventional voltage regulator and switching circuit for an AC generator of an automobile having two distinct output voltage levels. An AC generator driven by the engine of the automobile includes a stationary armature winding 101 and a field winding 102 mounted on a rotor. A full-wave rectifier circuit 2 rectifies the AC voltages induced in the armature winding 101 and outputs a DC voltage E1 across the positive and negative output terminals 201 and 202 thereof, the negative output terminal 202 of the rectifier being grounded The voltage regulator circuit 3, which regulates the output voltage of the generator to two distinct predetermined levels by controlling the field current, comprises a voltage divider circuit consisting of a series connection of resistors R1 and R2, a switch 301, and a resistor R3 connected and disconnected from the resistors R1 and R2 by the switch 301. The series connection of resistors R1 and R2 constitutes the voltage divider for detecting the battery voltage E2, while the series connection of resistors R1 through R3 constitutes the voltage divider for detecting the higher operating output voltage supplied to the load 5, the junction between the resistors R1 and R2 constituting the detecting point, as explained below. The voltage regulator 3 further comprises a Zener diode 302, a transistor 303, which becomes conductive when the Zener diode 302 suffers a reverse-voltage breakdown (Zener breakdown), and a power transistor 304 controlling the current through the field winding 102. The power transistor 304, which has a base coupled to the positive terminal of field winding 102 through a resistor R4, is turned off when the transistor 303 is turned on. A diode 305 is coupled across the field winding 102 to absorb the surge that is generated when the current through the field winding 102 is turned off. Output voltages of the generator at lower and higher levels are supplied to battery 4 and high voltage load 5 (such as a heater for melting ice on the windshield, etc., operated at a voltage higher than the battery voltage E2), respectively. The switching of the output between the two voltage levels supplied to the battery 4 and the load 5, respectively, is effected by the switching circuit 7 and the switch 301 for selecting the voltage divider, the circuit 7 including an output change-over switch 71 and an electromagnetic switch 72 coupled in series with the key switch 6.

The operation of the circuit of FIG. 1 is as follows. In the normal operation mode, the change-over switch 71 and the voltage divider switch 301 are coupled to the battery 4, as shown in the figure, and when the key switch 6 is closed to start the engine of the automobile, the electromagnetic switch 72 is automatically turned on. As a result, a current is supplied from the battery 4 to the field winding 102 of the generator 1. When the engine is started, the engine drives and rotates the field winding 102 with respect to the armature winding 101. Thus, AC voltages are induced in the armature winding 101 of the generator 1, and rectifier 2 outputs a DC voltage E1 across the output terminals 201 and 202 thereof As can be easily seen from the figure, the output voltage E1, the battery voltage E2, and the voltage E3 at the positive terminal of the voltage divider consisting of resistors R1 and R2 are substantially equal in this operation. Thus, when the output voltage E1 exceeds the lower predetermined level to raise the voltage E0 at the junction between the resistors R1 and R2 above the Zener breakdown voltage, the Zener diode 302 becomes conductive in the reverse direction to turn on the transistor 303, thereby turning off the power transistor 304. Thus, supply of current from the battery 4 to the field winding 102 is stopped. When, as a result, the output voltage E1 becomes lower than the predetermined level, the Zener diode 302 regains non-conductivity in the reverse direction, and the transistor 303 is turned off, thereby turning on the power transistor 304. By repeating these operations, the regulator 3 regulates the output voltage E1 to the lower predetermined level in the normal mode, which level is equal to the voltage E2 across the terminals of the battery 4.

When the operation is to be switched from the normal to the high voltage mode, the electromagnetic switch 72 is first opened to attenuate the current through the field winding 102, so that damage to the change-over switch 71, etc., caused by the inductance of the field winding 102 at the switching operation may be avoided. After a predetermined period of time at the end of which the field current has been sufficiently attenuated, the change-over switch 71 is coupled to the high voltage load 5, while the voltage divider selecting switch 301 is coupled to the resistor R3; thereafter, the electromagnetic switch 72 is made again (The sequential control of these switching operations are effected automatically by a switching operation control circuit (not shown) comprised in the circuit of FIG. 1.). Thus, the field current is supplied from the battery 4 to the field winding 102 being driven by the engine, and the resulting DC output E1 across the rectifier 2 is supplied to the high voltage load 5. In this condition, the voltage divider consists of three resistors R1 through R3, the detecting point being at the junction between the resistor R1 and R2. When the voltage E0 at the junction between the resistors R1 and R2 exceeds the Zener breakdown voltage, the Zener diode 302 becomes conductive in the reverse direction to turn on the transistor 303, thereby turning off power transistor 304. Thus, the output voltage E1 is regulated to the higher predetermined voltage which is required for the load 5. Also during this high voltage mode operation, the battery 4 keeps on supplying current to the field winding 102 without being charged by the generator. Thus, to prevent the over-discharge of the battery 4, the duration of the high voltage mode operation is limited to a short interval of time not exceeding about 5 minutes. When the voltage E2 across the battery 4 becomes lower than a predetermined level, the circuit stops the high voltage mode operation and returns to the normal mode. The sequential control of these switching operations are also effected by the switching operation control circuit associated with the switches 71, 72 and 301.

The conventional voltage regulator and switching circuit shown in FIG. 1 has the following disadvantages: First, the provision of the voltage divider selecting switch 301 increases the number of parts to be assembled, and hence production costs thereof; second, the voltage drop across the voltage divider selecting switch 301 increases with time due to deterioration thereof, thereby raising the lower and the higher regulated voltage in the normal and the high voltage mode operation, respectively; third, if the switch 301 breaks and the voltage drop thereacross becomes infinitely great, the voltage regulator ceases to function, and the field current is continuously supplied from the battery 4 irrespective of the output voltage E1, which, in consequence, is raised to an abnormally high level, thereby over-charging and damaging the battery 4 or injuring the high voltage load 5.

Japanese Laid-open Utility Model Application Nos. 55-87140 and 62-88500 also disclose voltage regulators for an alternating current generator with two output voltage levels. The first named application teaches a voltage regulator for an AC generator with two DC output voltages, while the second teaches a regulator for an AC generator with a low DC and a high AC output voltage. In both cases, however, the switching between the voltage detecting circuits for the two output voltages is effected by means of switches, as in the case of the conventional circuit shown in FIG. 1.

SUMMARY OF THE INVENTION

Thus, an object of this invention is to provide a voltage regulator and switching circuit for an AC generator having two distinct DC output levels which is economical, durable, and reliable.

A further and more specific object of this invention is to provide such a voltage regulator and switching circuit in which the switch for selecting the voltage divider used in each voltage level is dispensed with, so that, first, the number of parts assembled and hence the production costs may be reduced; second, the regulated voltage may remain constant throughout long and repeated usage; and third, the operation of the circuit may be more reliable and will not damage the battery and the electric load by abnormally high voltages outputted therefrom.

The circuit according to this invention comprises a rectifier circuit for rectifying the output of an AC generator, and a change-over switch which selectively couples the battery and a high voltage electrical load across the output terminals of the rectifier circuit. More precisely, the change-over switch takes one of two positions, i.e., it couples the battery across the outputs of the rectifier at the first position or it couples the high voltage load thereacross at the second. Further, the voltage divider circuit for detecting the output voltage according to this invention comprises at least three resistors and a rectifier diode, a serial connection of a first and a second resistor being coupled across the positive and the negative terminal of the battery with the rectifier diode being inserted between the positive or negative terminal of the battery and the corresponding terminal of the serial connection of the first and the second resistors. The forward direction of the diode is directed from the positive to the negative terminal of the battery in the serial circuit formed by the diode and the first and the second resistor. Further, a third resistor is coupled across a positive or negative terminal of the rectifier and the terminal of the serial connection of the first and the second resistor to which the rectifier diode is coupled. Voltage detector means, preferably comprising a Zener diode, is coupled to the junction between the first and the second resistor to detect the voltage at the junction exceeding a predetermined value, and the field current supplied from the battery to the field winding of the AC generator is interrupted when the voltage at the junction exceeds the predetermined value. Due to the provision of the rectifier diode in the voltage divider circuit according to this invention, the output voltage of the rectifier is automatically regulated to two distinct levels according to the position of the change-over switch, that is to a lower level determined by the voltage divider consisting of the first and the second resistor when the change-over switch is at the first position and the battery is thus coupled across the output terminals of the rectifier circuit, and to a higher level determined by the voltage divider consisting of the three resistors in serial connection (the third, the first, and the second resistor connected in this order) when the change-over switch is at the second position and the high voltage load is thus coupled across the output terminals of the rectifier circuit. In a preferred embodiment, the terminal of the serial connection of the diode and the first and the second resistor is coupled to a terminal of the field winding (which in its turn is coupled to a terminal of battery), and a further voltage divider consisting of a fourth and a fifth resistor is coupled across the battery. In such a case, the junction between the first and the second resistor and the junction between the fourth and the fifth resistor are coupled to the voltage detector means (Zener diode) through a rectifier diode, respectively, and the voltage divider formed by the fourth and the fifth resistor constitutes the main voltage divider for detecting the battery voltage.

BRIEF DESCRIPTION OF THE DRAWINGS

The novel features which are believed to be characteristic of this invention are set forth in the appended claims. This invention itself, however, both as to its organization and method of operation, may best be understood by reference to the following detailed description of the preferred embodiments taken in conjunction with the accompanying drawings in which:

In the drawings, like reference numerals and characters represent like or corresponding parts or portions.

DETAILED DESCRIPTION OF THE PREFERRED EMBODIMENTS

Figure 1:
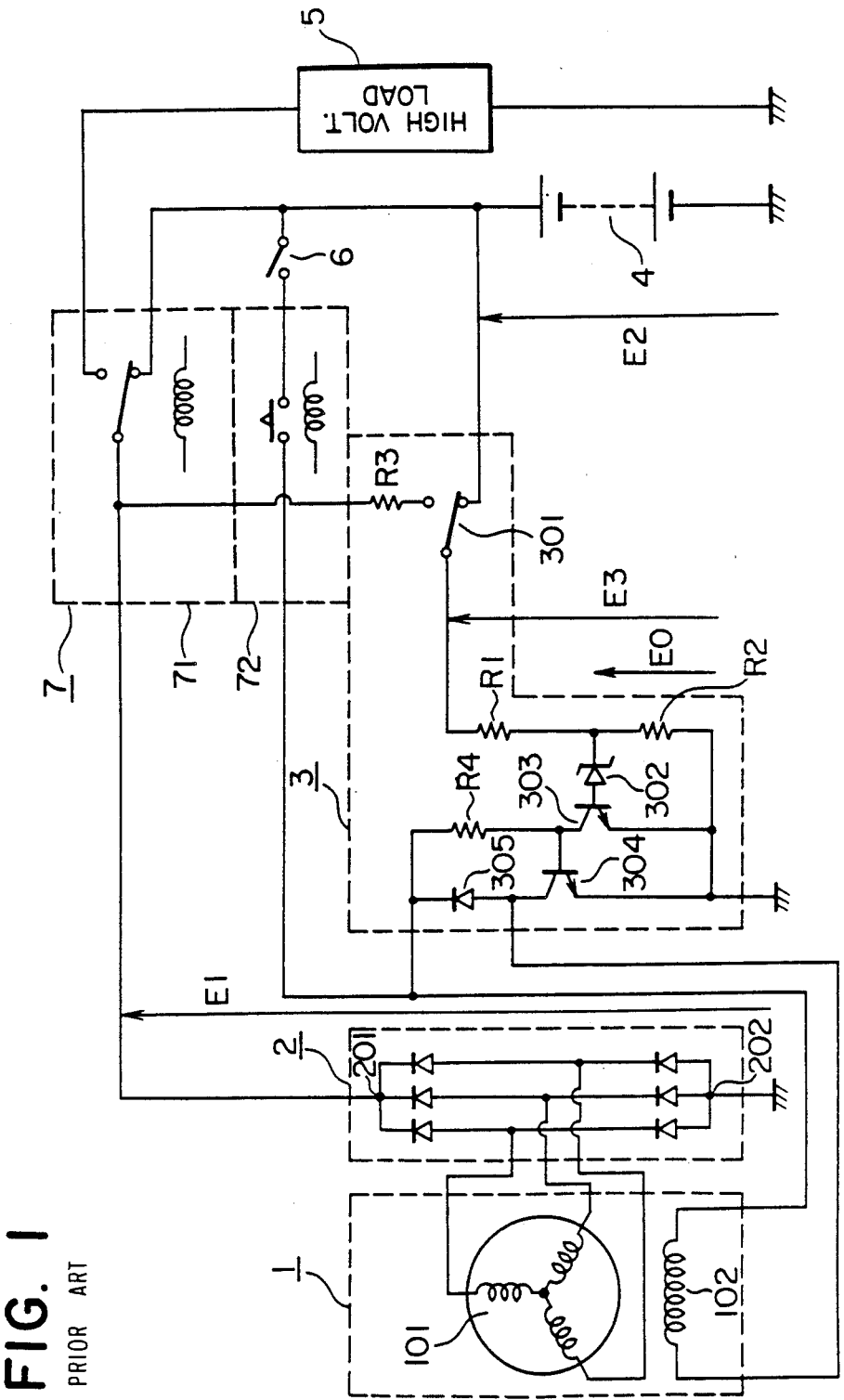
FIG. 1 is a circuit diagram showing a conventional voltage regulator and switching circuit for an AC generator with two distinct output voltage levels.
Figure 2:
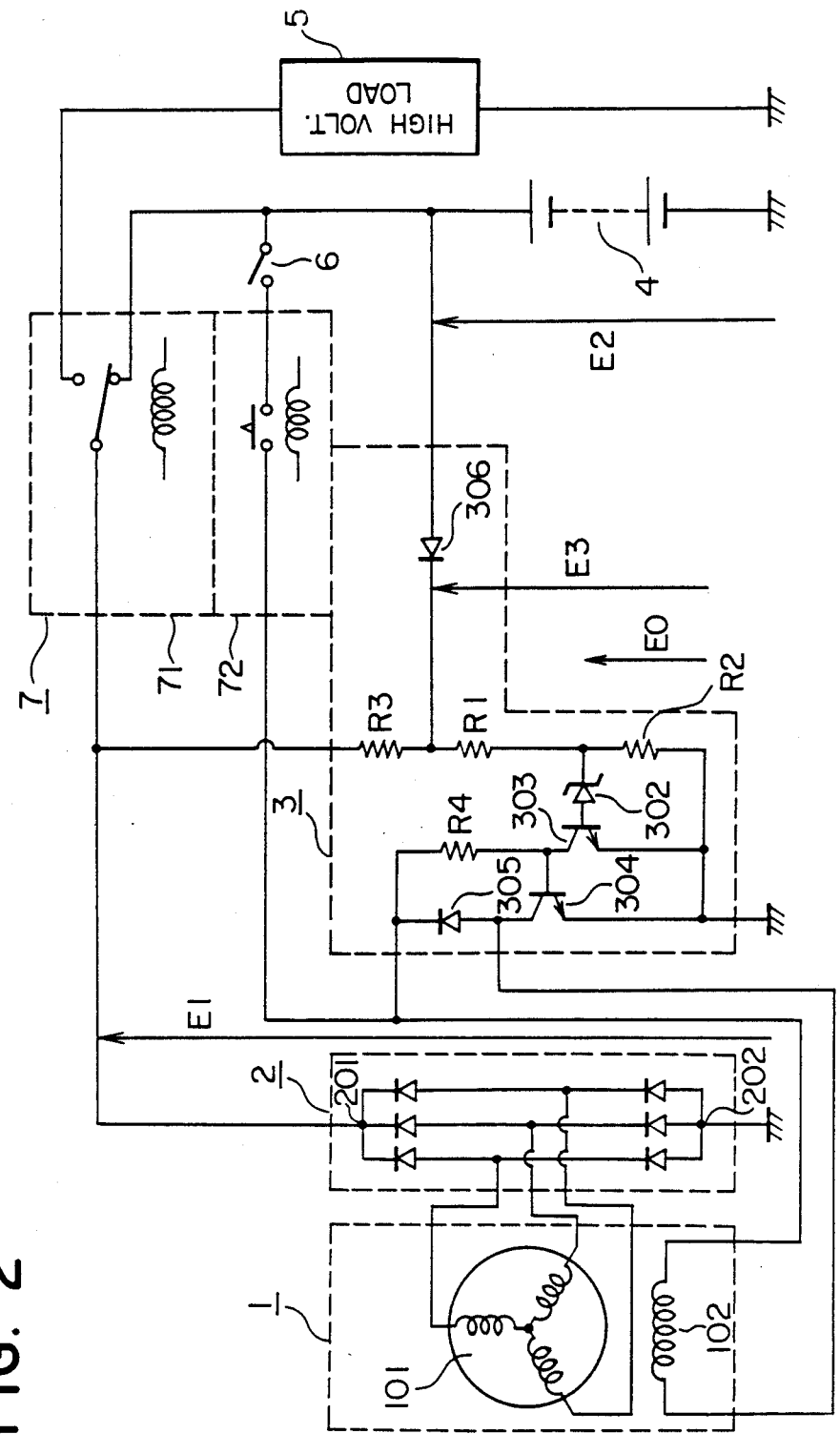
FIG. 2 is a circuit diagram similar to that of FIG. 1, but showing the principle of this invention.

Referring first to FIG. 2 of the drawings, the principle of this invention will be described. The voltage regulator circuit for an AC generator of an automobile shown in FIG. 2 is identical with that shown in FIG. 1, except for the voltage divider circuit for detecting the higher and the lower output voltage. Namely, voltage divider selecting switch 301 of FIG. 1 is dispensed with, and resistor R3 is directly coupled across the positive terminal 201 of the rectifier 2 and the positive terminal of the serial connection of resistors R1 and R2 and further, instead of the voltage divider selecting switch 301, a rectifier diode 306 is coupled across the positive terminal of the battery 4 and the junction point between resistors R1 and R3 (i.e. the positive terminal of serial connection of resistors R1 and R2). Otherwise, the circuit of FIG. 2 is similar to that of FIG. 1, with like reference numerals representing like or corresponding parts or portions.

The operation of the circuit of FIG. 2 according to this invention is as follows.

First, the operation in the normal mode will be explained. The change-over switch 71 for selecting the output is usually coupled to the side of battery 4 as shown in the figure. When the key switch 6 is made and the electromagnetic switch 72 is made in consequence, field current is supplied from the battery 4 to the field winding 102 which is rotated by the engine with respect to the armature winding 101 The AC voltages induced in the armature winding 101 are rectified into a DC voltage by the full-wave rectifier circuit 201, and the rectified output voltage E1 across the positive and the negative terminal 201 and 202 thereof is supplied to the battery 4 through the switch 71. Thus, during operation in the normal mode, the output voltage E1 is substantially equal to the battery voltage E2. Consequently, the voltage E3 at the positive terminal of the voltage divider consisting of the serial connection of resistors R1 and R2 is also substantially equal to the battery voltage E2. Hence, the voltage E0 at the detecting point (i.e. the junction between the resistors R1 and R2) is given by the following equation:

$$E0 = E1 \cdot R2/(R1+R2) \quad (1)$$

When this voltage E0 exceeds a predetermined voltage Ez (referred to as Zener voltage hereinbelow) determined by the Zener breakdown voltage of the Zener diode 302, the Zener diode 302 becomes conductive in the reverse direction to turn on the transistor 303; thus, power transistor 304 is turned off to interrupt the supply of field current from the battery 4 to the field winding 102. When, on the other hand the voltage E0 given by equation (1) above becomes lower than the Zener voltage Ez as a result of the interruption of the field current, the Zener diode 302 again becomes non-conductive in the reverse direction to turn off the transistor 302, thereby turning on power transistor 304 to supply field current from the battery 4 to the field winding 102. Thus, during the normal mode operation, the output voltage E1 across the terminals of the rectifier 2 is regulated to a voltage substantially equal to:

$$E1 = Ez \cdot (R1+R2)/R2. \quad (2)$$

The voltage divider functioning in this mode consists of a serial connection of resistors R1 and R2, the junction between resistors R1 and R2 forming the voltage detection point to which the Zener diode 302 is coupled.

On the other hand, the operation of the circuit of FIG. 2 in the high voltage mode is as follows. First, the electromagnetic switch 72 is opened to attenuate the field current, and the change-over switch 71 is coupled to the side of high voltage electrical load 5 consisting, for example, of a heater for melting ice on the windshield, etc., of the automobile. Thereafter, electromagnetic switch 72 is automatically made again to supply field current from the battery 4 to the field winding 102 which is rotated by the engine with respect to the armature winding 101 of the generator 1. The AC voltages induced in the armature winding 101 are rectified by the rectifier 2, and the output voltage E1 thereacross is supplied to the high voltage load 5 through the change-over switch 71. In this high voltage mode operation, the battery 4 is disconnected from the output voltage E1 of the rectifier 2, and keeps on discharging by supplying field current. Thus, the voltage E2 across the battery 4 continues to fall. Consequently, until the output voltage E1 rises to such a level to make the voltage E3 at the junction between resistors R3 and R1 higher than the battery voltage E2, the voltage E0 at the voltage detecting point (at the junction between resistors R1 and R2) which is given by equation (1) above does not rise above the above-defined Zener voltage Ez, and field current is continuously supplied from battery 4 to the field winding 102. After the output voltage E1 becomes high enough to make the voltage E3 higher than the battery voltage E2, the diode 306 is put in the reverse bias and disconnects the junction between the resistors R3 and R1 from the positive terminal of the battery 4. Then, the voltage E0 at the detecting point is given by the following equation:

$$E0 = E1 \cdot R2/(R1+R2+R3). \quad (3)$$

When this voltage E0 given by equation (3) exceeds the above-defined Zener voltage Ez, the supply of field current from the battery 4 to the field winding 102 is interrupted by the operation of Zener diode 302 and transistors 302 and 304. When, on the other hand, the voltage E0 given by equation (3) falls under the Zener voltage Ez, the supply of field current from the battery 4 is resumed Thus, during the high voltage mode operation, the output voltage E1 is regulated to a voltage substantially equal to:

$$E1 = Ez \cdot (R1+R2+R3)/R2. \quad (4)$$

The voltage divider functioning in this mode consists of three serially connected resistors R1 through R3, the junction between resistors R1 and R2 forming the voltage detecting point to which the Zener diode 302 is coupled. As described above, the switching between the voltage dividers, which has been effected by a switch in conventional circuits, is effected by means of a rectifier diode 306 according to this invention. Thus, the voltage divider selecting switch 301 of the conventional circuit of FIG. 1 can be dispensed with.

Figure 3:
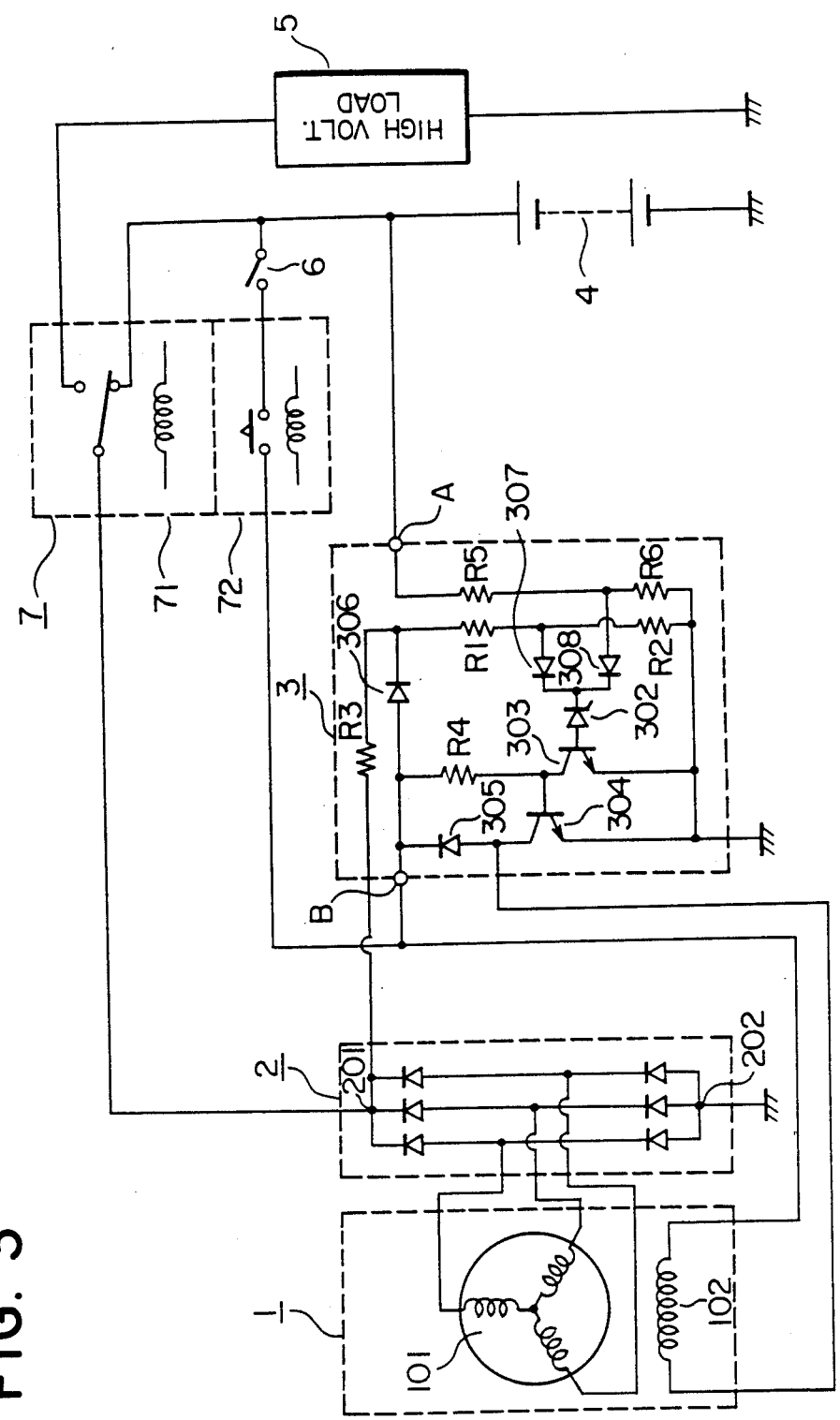
FIG. 3 is also a circuit diagram similar to that of FIG. 1, but showing a first embodiment according to this invention having a main and an auxiliary voltage divider for detecting the battery voltage.

Referring now to FIG. 3 of the drawings, a first embodiment of this invention is described. The circuit shown in FIG. 3 is similar to that shown in FIG. 2, except for the voltage divider circuit of the voltage regulator. Namely, a main voltage divider for detecting the voltage across the battery 4, consisting of a serial connection of resistors R5 and R6, is coupled directly across the positive and negative terminals of battery 4, and the battery voltage detecting terminal A of the voltage regulator 3 (at the positive terminal of the serial connection of resistors R5 and R6) is coupled to the positive terminal of battery 4. Further, a serial connection of resistors R3, R1 and R2 (in this order) is coupled across the positive and the negative terminal 201 and 202 of the rectifier 2, and a rectifier diode 306 is coupled across the positive terminal of field winding 102 and the positive terminal of serial connection of resistors R1 and R2, in serial circuit relationship with the serial connection of resistors R1 and R2, the forward direction of diode 306 being directed from the positive to the negative terminal of battery 4. (Reference character B designates the terminal of the regulator 3 coupled to the positive terminal of the field winding 102.) The junction point between resistors R5 and R6 and that between resistors R1 and R2 are coupled to the Zener diode 302 through diodes 307 and 308, respectively, the forward directions thereof being directed toward the Zener diode 302. Thus, a voltage higher among the voltages at the junction between resistors R4 and R5 and the junction between resistors R1 and R2 is applied to the Zener diode 302. The values of the resistances R1, R2, R5 and R6 are selected in such a way that the ratio of R1 to R2 and the ratio of R5 to R6 are substantially equal.

The operation of the voltage divider circuit consisting of resistors R1 through R3 and the rectifier diode 306 is similar to the operation of the voltage divider circuit of FIG. 2 consisting of resistors R1 through R3 and the rectifier diode 306. However, in the normal mode operation in which the change-over switch 71 is coupled to the side of the battery 4, the voltage divider consisting of a serial connection of resistors R5 and R6 functions as the main voltage divider circuit for detecting the battery voltage. The voltage divider consisting of a serial connection of resistors R1 and R2, on the other hand, functions only when the battery voltage detecting terminal A is disconnected from the positive terminal of the battery 4, which may occur, for example, as a result of oscillations caused by the engine. If such disconnection of the terminal A from the battery 4 happens, the battery voltage is supplied to the serial connection of resistors R1 and R2 through key switch 6, electromagnetic switch 72, and diode 306. Thus, the output voltage E1 across the positive and the negative terminals 201 and 202 of the rectifier 2 is regulated to a voltage given by the following equation in the normal mode:

$$E1 = Ez \cdot (R5 + R6)/R6, \quad (5)$$

wherein Ez is the Zener voltage as defined above. When the terminal A is disconnected, the output voltage E1 is given by equation (2) instead of equation (5) above.

In the high voltage mode, on the other hand, the change-over switch 71 is coupled to the high voltage load 5, and the voltage across the battery 4 continues to fall, as described above. Thus, the voltage divider consisting of resistors R5 and R6 ceases to function, and the voltage divider consisting of resistors R1 through R3 comes into operation, just as in the case of the voltage divider circuit of FIG. 2 consisting of resistors R1 through R3 and rectifier diode 306. Thus the output voltage E1 is given by equation (4) above.

Figure 4:
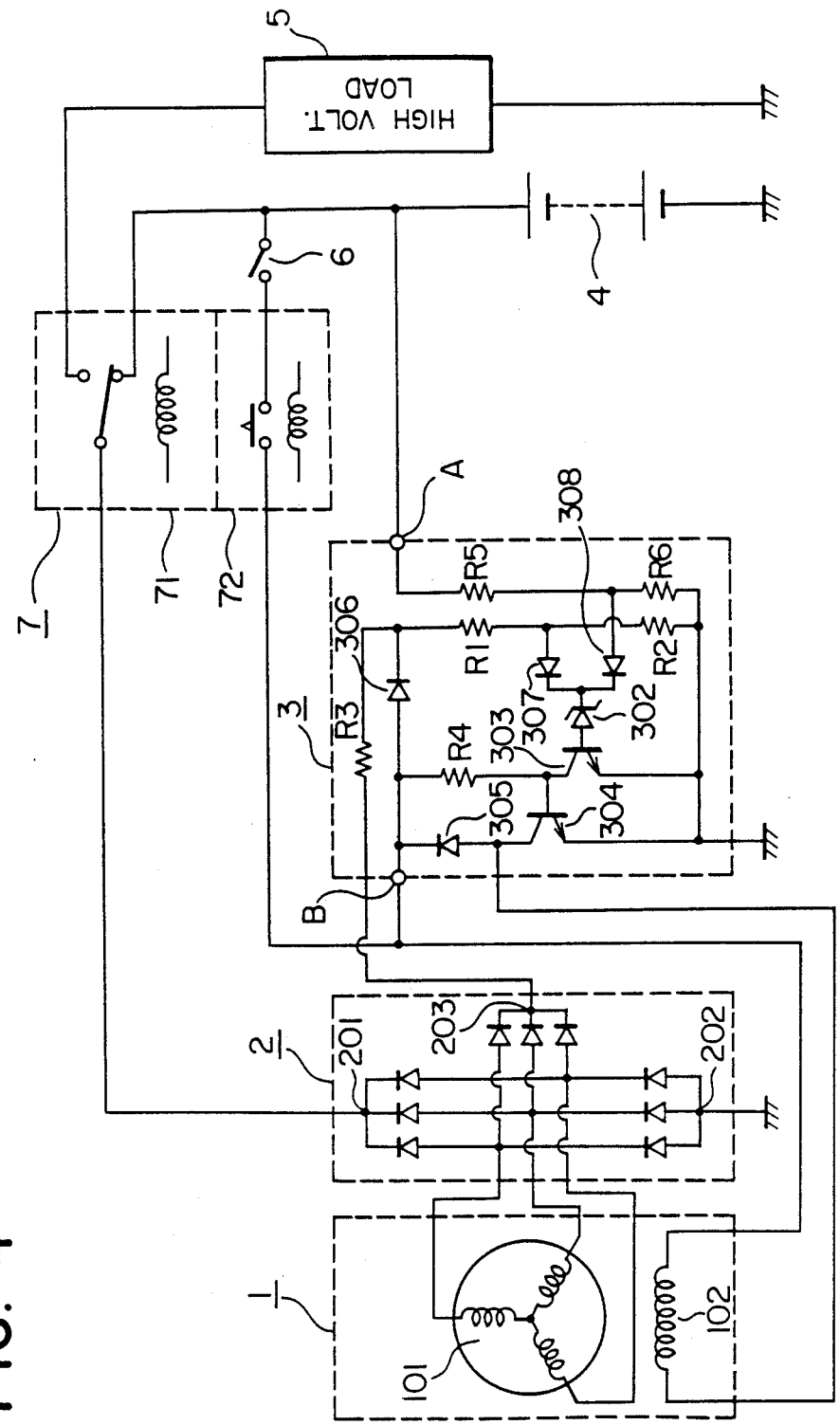
FIG. 4 is also a circuit diagram similar to that of FIG. 1, but showing a second embodiment according to this invention which has a main and an auxiliary voltage divider for detecting the battery voltage and which comprise a rectifier circuit having an auxiliary output terminal.

FIG. 4 shows a second embodiment of this invention, which is similar to the first embodiment described above. However, the rectifier 2 shown in FIG. 4 comprises, in addition to the main positive output terminal 201, an auxiliary positive output terminal 203, and the serial connection of resistors R3, R1 and R2 (in this order) is coupled across this auxiliary positive terminal 203 and the negative terminal 202 of the rectifier 2. Otherwise, the structure of the circuit of FIG. 4 is similar to that of the circuit of FIG. 3. Since the output voltage across the auxiliary positive and the negative terminal 203 and 202 is substantially equal to the output voltage across the main terminals 201 and 202, the output voltage across the auxiliary positive and the negative terminal of the rectifier circuit is substantially equal to the voltage across the battery 4 in the normal mode operation. Thus, although the auxiliary terminal 203 is not directly coupled to the positive terminal of the battery 4, the operation of the voltage regulator 3 of FIG. 4 is substantially the same as that of the regulator 3 of FIG. 3. Thus, the output voltage E1 across the main or the auxiliary positive terminal 201 or 203 and the negative terminal 202 of the rectifier 2 is given by equation (5) or (2) above in the normal mode, and by equation (4) in the high voltage mode operation.

While description has been made of the particular embodiments of this invention, it will be understood that many modifications may be made without departing from the spirit of this invention; the appended claims are contemplated to cover any such modifications as fall within the true spirit and scope of this invention.

What is claimed is:

1. A voltage regulator circuit, for an AC generator including a field winding supplied with a field current from a battery coupled thereacross, and an armature winding in which AC voltages are induced by a magnetic field generated by the field winding, said voltage regulator circuit comprising:

rectifier circuit means, coupled to output terminals of said armature winding of said AC generator, for rectifying said AC voltages induced in said armature winding and outputting a DC voltage across positive and negative output terminals thereof;

selective coupling means for selectively coupling said battery and an electrical load across said positive and negative output terminals of said rectifier circuit means, said selective coupling means including a switch coupled to a terminal of said rectifier means and being alternatively positioned at a first and a second contact position, said switch selectively coupling said battery and said load across said positive and negative output terminals of said rectifier circuit means at said first and said second position, respectively, said load being operated at a voltage higher than a voltage across said battery;

a first serial connection of a first ($R_1$) and a second ($R_2$) resistor, said first serial connection having a first terminal and a second terminal and being coupled across a positive and a negative terminal of said battery;

a rectifier diode having one of its terminals coupled to a terminal of said battery and the other of its terminals coupled to said first terminal of said first serial connection of two resistors, in serial circuit relationship with said first serial connection of the first and the second resistor, a forward direction of said rectifier diode coinciding with a direction from the positive to the anegative terminal of said battery in a serial circuit formed by said rectifier diode and said first serial connection of the first and the second resistor;

a third resistor ($R_3$) coupled across one of said terminals of said rectifier circuit means and said first terminal of said first serial connection of the first and the second resistor to which said rectifier diode is coupled, said third resistor and said first serial connection comprising a second serial connection;

voltage detector means for detecting a voltage at a junction between the first and the second resistor;

field current regulating means, having an input coupled to said voltage detector means and including a switching means coupled in series with said field winding, for interrupting said field current supplied from said battery by turning off said switching means when said voltage at said junction between the first and the second resistor detected by said voltage detector means exceeds a predetermined level;

wherein said first serial connection of the first and the second resistor constitutes a first voltage divider for detecting the output voltage of said rectifier circuit means when said switch of the selective coupling means is at said first contact position, and said second serial connection formed by the third, the first, and the second resistor constitutes a second voltage divider for detecting the output voltage of said rectifier circuit means when said switch of the selective coupling means is at said second contact position, said rectifier diode electronically switching said first serial connection and said second serial connection across said rectifier circuit means in response to operation of said selective coupling means and;

wherein a third serial connection is formed by said rectifier diode and the first ($R_1$) and the second ($R_2$) resistor, said third serial connection being directly coupled across the positive and negative terminals of said battery, and one of said battery terminals being coupled to a terminal of said field winding.

2. A voltage regulator circuit for an AC generator (1) including a field winding supplied with a field current from a battery coupled thereacross, and an armature winding in which AC voltages are induced by a magnetic field generated by the field winding, said voltage regulator circuit comprising:

rectifier circuit means, coupled to output terminals of said armature winding of said AC generator, for rectifying said AC voltages induced in said armature winding and outputting a DC voltage across positive and negative output terminals thereof;

selective coupling means for selectively coupling said battery and an electrical load across said positive and negative output terminals of said rectifier circuit means, said selective coupling means including a switch coupled to a terminal of said rectifier means and being alternatively positioned at a first and a second contact position, said switch selectively coupling said battery and said load across said positive and negative output terminals of said rectifier circuit means at said first and said second position, respectively, said load being operated at a voltage higher than a voltage across said battery;

a first serial connection of a first ($R_1$) and a second ($R_2$) resistor, said first serial connection having a first terminal and a second terminal and being coupled across a positive and a negative terminal of said battery;

a rectifier diode having one of its terminals coupled to a terminal of said battery and the other of its terminals coupled to said first terminal of said first serial connection of two resistors, in serial circuit relationship with said first serial connection of the first and the second resistor, a forward direction of said rectifier diode coinciding with a direction from the positive to the negative terminal of said battery in a serial circuit formed by said rectifier diode and said first serial connection of the first and the second resistor;

a third resistor ($R_3$) coupled across one of said terminals of said rectifier circuit means and said first terminal of said first serial connection of the first and the second resistor to which said rectifier diode is coupled, said third resistor and said first serial connection comprising a second serial connection;

voltage detector means for detecting a voltage;

field current regulating means, having an input coupled to said voltage detector means and including a switching means coupled in series with said field winding, for interrupting said field current supplied form said battery by turning off said switching means when said voltage detected by said voltage detector means exceeds a predetermined level;

a third serial connection formed by said rectifier diode and the first ($R_1$) and the second ($R_2$) resistor, said third serial circuit being directly coupled across the positive and negative terminals of said battery, and one of said battery terminals being coupled to a terminal of said field winding a fourth serial connection of a fourth ($R_5$) and a fifth ($R_6$) resistor being coupled directly across the positive and the negative terminal of said battery, the junction between the first and the second resistor and a junction between the fourth and the fifth resistor each being coupled to said voltage detector means through a respective rectifier diode, wherein said fourth serial connection of the fourth and the fifth resistors constitutes a main voltage divider for detecting the output voltage of said rectifier circuit means when said switch of the selective coupling means is at said first contact position, and said first serial connection of the first and the second resistor constitutes an auxiliary voltage divider for detecting the output of said rectifier circuit means when said switch of the selective coupling means is at said first contact position.

3. A voltage regulator circuit as claimed in any one of the claims 1 or 2, wherein said rectifier circuit means comprises an auxiliary output terminal and said third resistor is coupled between said auxiliary terminal of said rectifier circuit means and said first terminal of said first serial connection of the first and the second resistor.

4. A voltage regulator circuit as claimed in claim 1, wherein said voltage detector means comprises a Zener diode.

5. A voltage regulator circuit as claimed in claim 1, wherein said switching means included in said field current regulator means comprises a power transistor coupled in series with said field winding.

6. A voltage divider as claimed in claim 1, further comprising an electromagnetic switch coupled in series with said field winding.

* * * * *